Jan. 31, 1933. J. POWERS Re. 18,727

AUTOMATIC TOTAL TAKING MECHANISM FOR ACCOUNTING MACHINES

Original Filed Nov. 10, 1915 2 Sheets-Sheet 1

Witnesses;
Chas. E. Whiteman
H. D. Penney

Inventor:
James Powers,
By his Att'y, F. A. Richard.

Jan. 31, 1933. J. POWERS Re. 18,727

AUTOMATIC TOTAL TAKING MECHANISM FOR ACCOUNTING MACHINES

Original Filed Nov. 10, 1915 2 Sheets-Sheet 2

Witnesses:
Chas. S. Whiteman
H. D. Penney

Inventor:
James Powers,
By his Atty, F. H. Richards.

Reissued Jan. 31, 1933 Re. 18,727

UNITED STATES PATENT OFFICE

JAMES POWERS, OF LOS ANGELES, CALIFORNIA, ASSIGNOR, BY MESNE ASSIGNMENTS, TO REMINGTON RAND INC., OF NEW YORK, N. Y., A CORPORATION OF DELAWARE

AUTOMATIC TOTAL-TAKING MECHANISM FOR ACCOUNTING MACHINES

Original No. 1,245,506, dated November 6, 1917, Serial No. 60,629, filed November 10, 1915. Renewed May 2, 1917, Serial No. 166,050. Application for reissue filed February 8, 1919. Serial No. 275,884.

This invention relates to accounting machines generally, and more especially to machines for tabulating and adding the data contained on perforated record cards.

In the machines now in use, such as that disclosed in my Patent No. 1,245,502, issued November 6, 1917, whenever a group of data has been tabulated and is ready to be totaled, it is necessary to stop the machine and for the operator to operate means especially provided therefor.

The chief purpose of the invention is to make it possible to take a total in a card accounting machine without stopping the machine, thereby dispensing with the personal attention of an operator at the time such totaling occurs.

This result can be accomplished in various ways, and by way of example, I have illustrated a practical embodiment which contemplates the use of a total card having a perforation for co-operating with a pin, the pin being so operatively connected to the total-taking mechanism that, when the pin registers with the perforation of such total card, it will actuate the total-taking mechanism without interrupting the sequential run of cards.

A particular feature of the present invention is the provision of a single pin which co-operates with both the total card and stop card to produce different results, the arrangement being such that, when the total card registers with such pin, the pin will rise a different distance than when the stop card registers with such pin.

These and other features, capabilities and advantages of the present improvement will more fully appear from the subjoined detail description of one specific embodiment thereof, illustrated in the accompanying drawings, in which Figure 1 is an elevation showing an accounting machine equipped with the device forming the present improvement near printing position on a totaling cycle.

Figure 1:
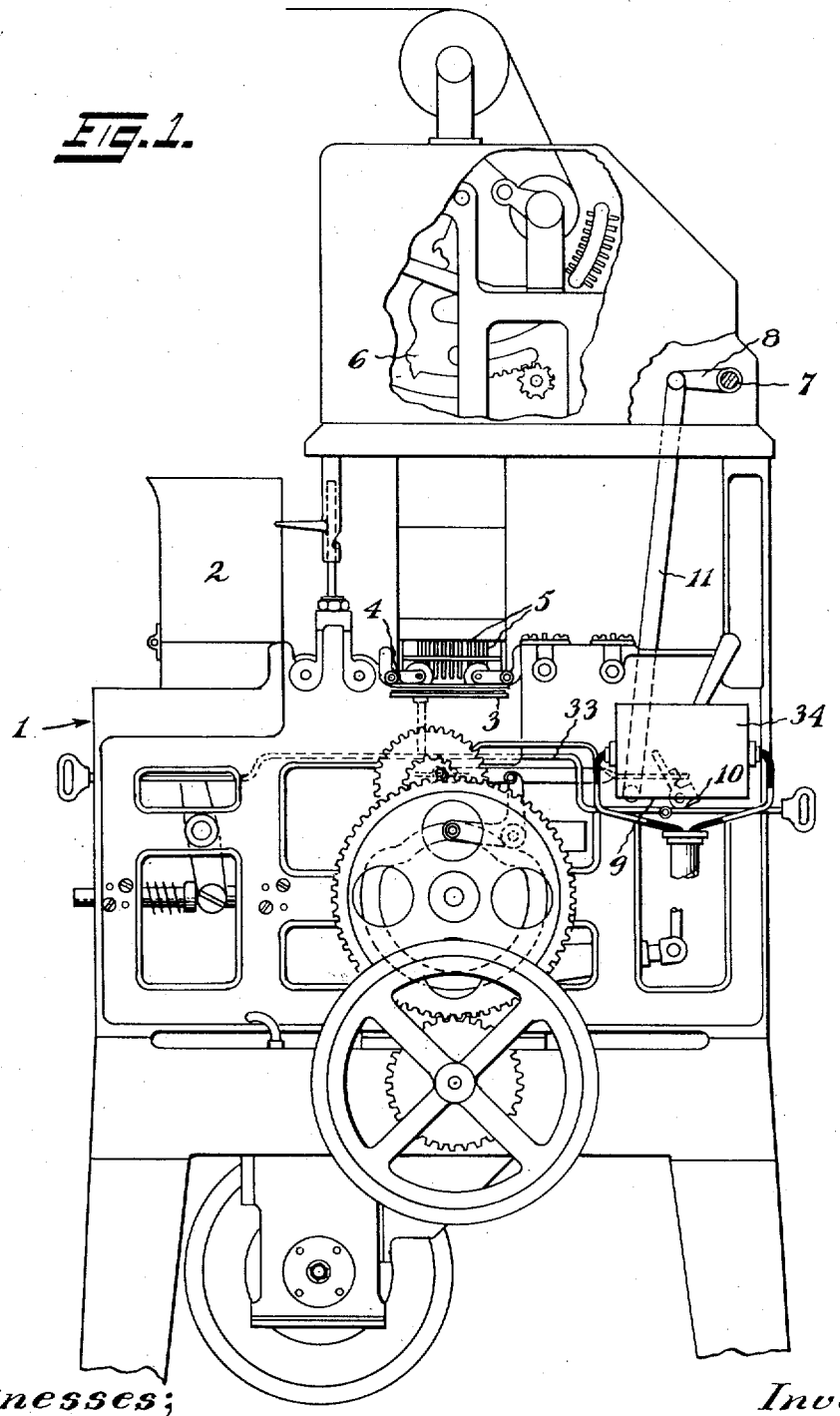

In the embodiment illustrated, an accounting machine is provided comprising a frame 1 having a card-hopper 2 in which the cards are piled preparatory to being fed between the plates 3 and 4, where they co-operate with the pins 5 to set the tabulating sectors 6, after which the cards are discharged from between the plates 3 and 4.

For actuating the totaling mechanism, the shaft 7 is provided, which, in the present instance, has attached thereto a lever 8 which is connected to the extension 9 of the bracket 10 by a link 11.

The connection between the shaft 7 and the totaling mechanism may be of the usual or ordinary construction in adding machines of the type shown, for instance, in the patent to Hopkins, No. 1,039,130, issued September 24th, 1912, or the patent to Walker, No. 1,016,308, issued February 6th, 1912.

With the present arrangement, a pin or shiftable control means 12 is used, which serves both as an element of the means for initiating the total taking action and for initiating the arresting or stopping of the operation of the machine. The pin comprises an enlarged lower body portion 13, a diminished upper body portion 14, a collar 15 of greater diameter than the enlarged body portion 13 disposed between the two body portions 13 and 14, and a similar collar 16 disposed a short distance removed from the free end of the diminished body portion 14. The enlarged body portion 13 is slidably mounted in an opening formed in the lower plate 17 of a vertically reciprocating pin-box 18, and the diminished body portion 14 is slidable in an opening formed in the upper plate 19 of said pin-box. The collar 15 is disposed between the plates 17 and 19 and of greater diameter than the diameter of the openings through which the body portions 13 and 14 slide so as to anchor the pin 12 in place. Between the collar 15 and the plate 17, a spring 20 is strained to normally maintain the pin 12 in raised position. The diminished portion of the pin 14 is adapted to pass through the openings 21 and 22 of the plates 3 and 4, the openings 21 and 22 being of sufficient diameter to permit the collar 16 to pass therethrough.

The lower end of the enlarged body portion 13 is provided with an opening 23 extending transversely therethrough, in which the diminished extension 24 of a link 25 is disposed, the main portion of the link 25, to one side of the pin 12, being pivotally connected to the free end of one arm 26 of a bell crank 27, which is pivotally connected at its angle to the frame 1, the free end of the other arm 28 being provided with a roller 29 to travel in the cam-groove 30 of the cam-wheel 31. The free end of the extension 24 is adapted, when the pin 12 is raised to its highest position, to engage the collar 32 of the switch-rod 33. The switch-rod 33 is suitably connected with the switch-box 34 so that, when the collar 32 is engaged by the extension 24 and moved thereby, the switch-rod 33 will operate the switch-box 34 to disconnect the power so that the machine will cease operating.

The bracket 10 comprises the aforesaid arm 9, an arm 35, and an intermediate connecting portion 36. The arm 9 extends upward at an angle relative to the direction of the arm 35 and the arm 35 is provided with an upward extension 37 having a lug 38 intermediate thereof extending toward the connecting portion 36. The bracket 10 is pivotally connected to the frame 1 at the free end of the arm 35. The link 25 is provided with the aforesaid extension 24 at one end and at the other end is provided with an opening 39 through which the extension 37 passes in order to permit the portion 39′ of the link 25 to co-operate with the lug 38 of the extension 37 and the relatively receding portions of the extensions 37 to either side of the lug 38.

Figure 2:
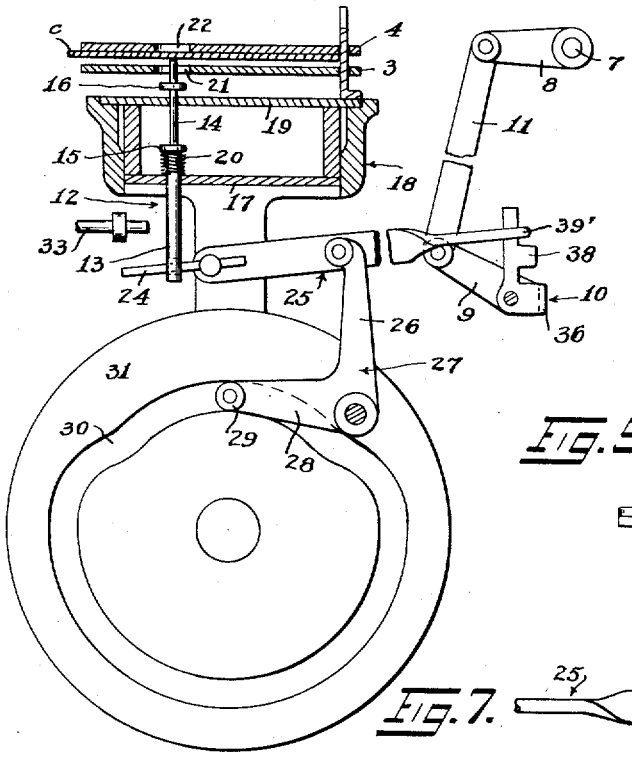
Figs. 2, 3 and 4 are enlarged fragmental details in elevation showing three different positions of the device forming the present improvement in the course of its operation.
Figure 5:
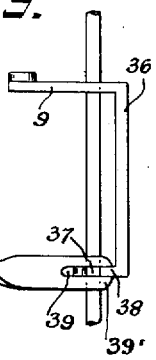
Fig. 5 is an enlarged fragmental detail in plan of a part of the device illustrated in Figs. 2, 3 and 4.

The operation of the device is as follows: Whenever a car C is disposed between the plates 3 and 4, and there is no perforation in the card C to register with the openings 21 and 22 of the plates 3 and 4, (as shown in Fig. 2), with the upward movement of the pin-box 18, the pin 12 will rise and its upper free end being obstructed by the card C from passing therethrough, the portion 39′ of the link 25 will be disposed in alinement with the relatively receding portion of the extension 37 above the lug 38, while the extension 24 will be disposed below and out of alinement with the collar 32 of the switch rod, and thereupon, with the sliding movement of the link 25, caused by the actuation of the bell crank 27, the portion 39′ will approach the extension 37 above the lug 38 without engaging the extension 37.

Figure 6:
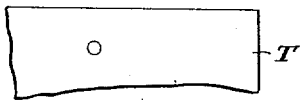
Figs. 6 and 7 are fragmental views respectively of a total card and a stop card.
Figure 3:
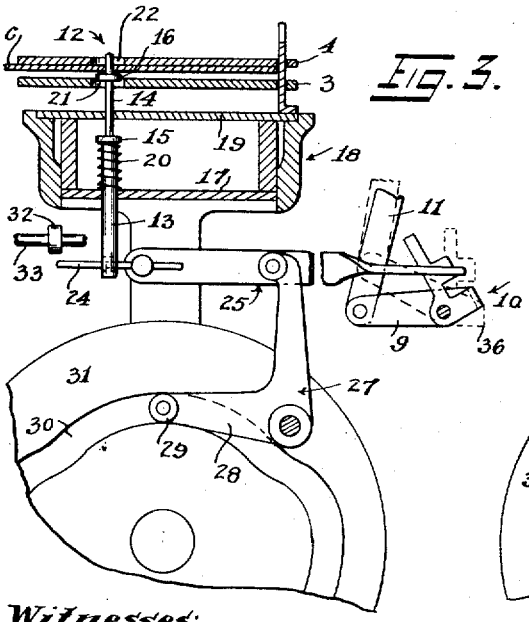

When a run or group of cards are to be tabulated or registered and subsequently a total is to be taken of such run, or a number of groups of cards are to be tabulated or registered, and grand totals taken of all of the cards previously tabulated at the end of each group, a card T is inserted at the end of each group, which is provided with a perforation (as shown in Fig. 6) to register with the openings 21 and 22 of the plates 3 and 4, which perforation is of less diameter than the diameter of the collar 16, and consequently, when the pin box 18 is raised, the pin 12 will rise until its collar 16 strikes the card T and is thereby obstructed from further upward movement (as shown in Fig. 3). In this position of the pin 12, the portion 39′ of the link 25 will be in alinement with the lug 38, and thereupon, with the sliding movement of the link 25, caused by the actuation of the bell crank 27, the bracket 10 will be rocked about its pivotal connection with the frame 1, thereby depressing the arm 9 to draw down the link 11 which will depress the arm 8 to rock the total-taking shaft 7, whereupon the totalizing mechanism is actuated, and the operation of the registering mechanism resumed, without stopping the machine.

Figure 7:
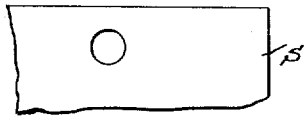
Figure 4:
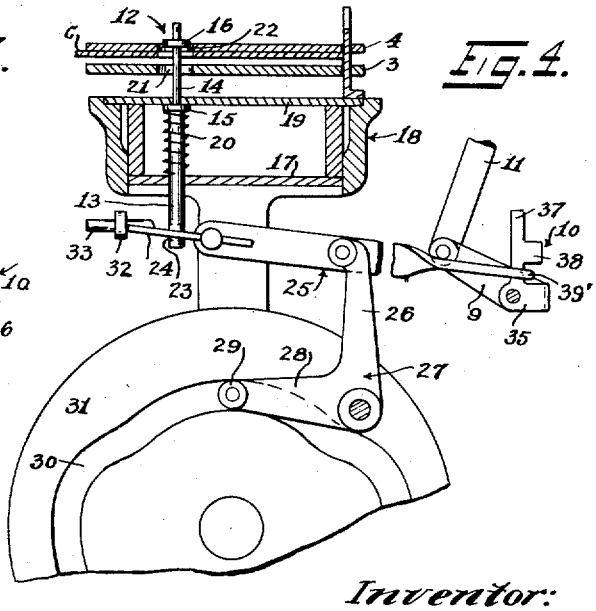

When a stop-card S passes through the machine, which, as shown in Fig. 7, is provided with an opening of a diameter equal to the diameter of the openings 21 and 22 of the plates 3 and 4, and registers with the said openings 21 and 22, the succeeding rise of the pin box 18 will raise the pin 12 with it, and such pin 12, not being obstructed by the card S, will pass through the perforation of the card S, and the opening 22 of the plate 4, as shown in Fig. 4. In such position, the pin 12 will have raised the extension 24 of the link 25 into alinement with the collar 32 and the portion 39′ into alinement with the relatively receding portion of the extension 37 below the lug 38 and thereupon with the succeeding sliding movement of the link 25, caused by the actuation of the bell crank 27, the switch rod 33 will be actuated to stop the machine and the portion 39′ will approach the extension 37 without engaging the same.

It will, of course, be understood that various changes and modifications may be made to the details of construction without in any way departing from the general spirit or scope of the present invention.

While the disclosure of this application includes the use of what is known as a total card, the invention is not limited to this particular method of accomplishment, and the present application is intended to cover any form of mechanism wherein there is automatic means controlled by cards, or other registration control means or total-taking initiating means or otherwise, as for example a card or record which is blank in the accumulation control fields, but may have a total hole and any desired combination or combinations of classification perforations, for actuating a total taking mechanism and resuming the operation of the registering mechanism, or without stopping the machine. Herein the total-taking mechanism is described as "automatic". By this it is understood that the operation of total-taking is automatic not only after it is initiated, but that the total-taking is also automatically initiated, for instance by the presentation of a card or other control device. Because of this automatic initiating the card or control device may be said to automatically initiate automatic total taking.

I claim:

1. In an accounting machine having a pin mechanism for co-operating with perforated cards and registering mechanism for co-operating with said analyzing mechanism, the combination with a total taking shaft and a stop mechanism, of actuating means for said total taking shaft and stop mechanism; connecting means; a total card for co-operating with said pin mechanism to set said connecting means to connect said total taking shaft to be actuated by said actuating means, and a stop card for co-operating with said pin mechanism to set said connecting means to connect said stop mechanism to be actuated by said actuating means.

2. In an accounting machine having a perforated card analyzing mechanism and registering mechanism for co-operating with said analyzing mechanism, the combination with a total taking shaft, of a stop mechanism; an actuating mechanism; connecting mechanism; a card for co-operating with said analyzing mechanism to set said connecting mechanism to operatively connect said total taking shaft to be actuated by said actuating mechanism; and a card for co-operating with said analyzing mechanism to set said connecting mechanism to operatively connect said stop mechanism to be actuated by said actuating mechanism.

3. In an accounting machine having a perforated card analyzing mechanism and registering mechanism for co-operating with said analyzing mechanism, the combination with a total taking shaft, of a stop mechanism; an actuating mechanism; connecting mechanism comprising a pin co-operating with said analyzing mechanism; a link; a stop card for co-operating with said pin to set said link to operatively connect said stop mechanism with said actuating mechanism; and a total card for co-operating with said pin to set said link to operatively connect said total taking shaft with said actuating mechanism.

4. In an accounting machine having a perforated card analyzing mechanism and registering mechanism for co-operating with said analyzing mechanism, the combination with a total taking shaft, a stop mechanism; an actuating mechanism; connecting mechanism comprising a pin co-operating with said analyzing mechanism; a diminished portion on said pin; a collar a short distance removed from said diminished portion; a link operatively connected with said pin and said actuating mechanism; a stop card having an enlarged perforation to permit the passage therethrough of said collar and thereby to set said link to operatively connect with said stop mechanism; and a total card having a small opening to permit the passage therethrough of said diminished portion but to obstruct the collar and thereby set said link to operatively connect with said total taking shaft.

5. In an accounting machine having a perforated card analyzing mechanism and registering mechanism for co-operating with said analyzing mechanism, the combination with a total taking shaft, of a stop mechanism; an actuating mechanism; connecting mechanism comprising a pin having a diminished portion and a collar a short distance removed from the end of said diminished portion; a link operatively connected with said pin and said actuating mechanism; a stop card having an enlarged perforation to permit the passage therethrough of said collar; a total card having a small opening to permit the passage therethrough of said diminished portion but to obstruct the collar; means for actuating said stop mechanism being disposed in the path of movement of said link when the pin is positioned by a stop card; and adapted at such time to be actuated when such actuating mechanism operates said link; and means for actuating said total taking shaft, being disposed in the path of movement of said link when the pin is positioned by a total card and at such time adapted to be actuated when said actuating mechanism operates said link.

6. In a card accounting machine, the combination of an automatic registering mechanism; a total-taking mechanism; a stop mechanism; and means acting to automatically take a total and to automatically stop the machine after totalizing.

7. In a card accounting machine, the combination of an automatic registering mechanism; a total-taking mechanism; a stop mechanism; and card controlled means acting to automatically take a total and to automatically stop the machine after totalizing.

8. In a card accounting machine having a registering mechanism operated by a sequential run of cards, the combination of a total-taking mechanism and a stop mechanism; and means controlled in turn by a total-taking card and a stop card for automatically taking a total and for automatically stopping the machine.

9. In a card feed accounting machine, a registering mechanism; a totalizing mechanism; a stop mechanism; and card controlled means constructed and arranged to selectively determine the automatic operation of any one of said mechanisms.

10. In combination, an automatic registering mechanism for registering plural numbers; a total-taking mechanism; a stop-mechanism; and a card-controlled means controllable by a single card at a time free of simultaneous cooperation with any other card, for selectively bringing about the operation of said registering mechanism or said stop-mechanism.

11. In combination, an automatic registering mechanism for registering plural numbers; an automatic total-taking mechanism; a stop mechanism; and a card controlled means controllable by a single card at a time free of simultaneous cooperation with any other card, for selectively initiating and bringing about the operation of said registering mechanism or said stop-mechanism.

12. In a machine of the class described the combination of a record analyzing mechanism which can operate continuously; a registering means, a totaling means, and a stop means controlled thereby; and devices controlled by said mechanism for selecting any of said means for operation.

13. In a machine of the class described the combination of a record analyzing mechanism which can be operated continuously; a registering means, a totaling means, and a stop means controllable thereby; a main actuator, and devices controlled by said mechanism for selecting any of said means for operation by said main actuator.

JAMES POWERS.